(No Model.)
T. D. KING.
BALANCE.
No. 274,202. Patented Mar. 20, 1883.
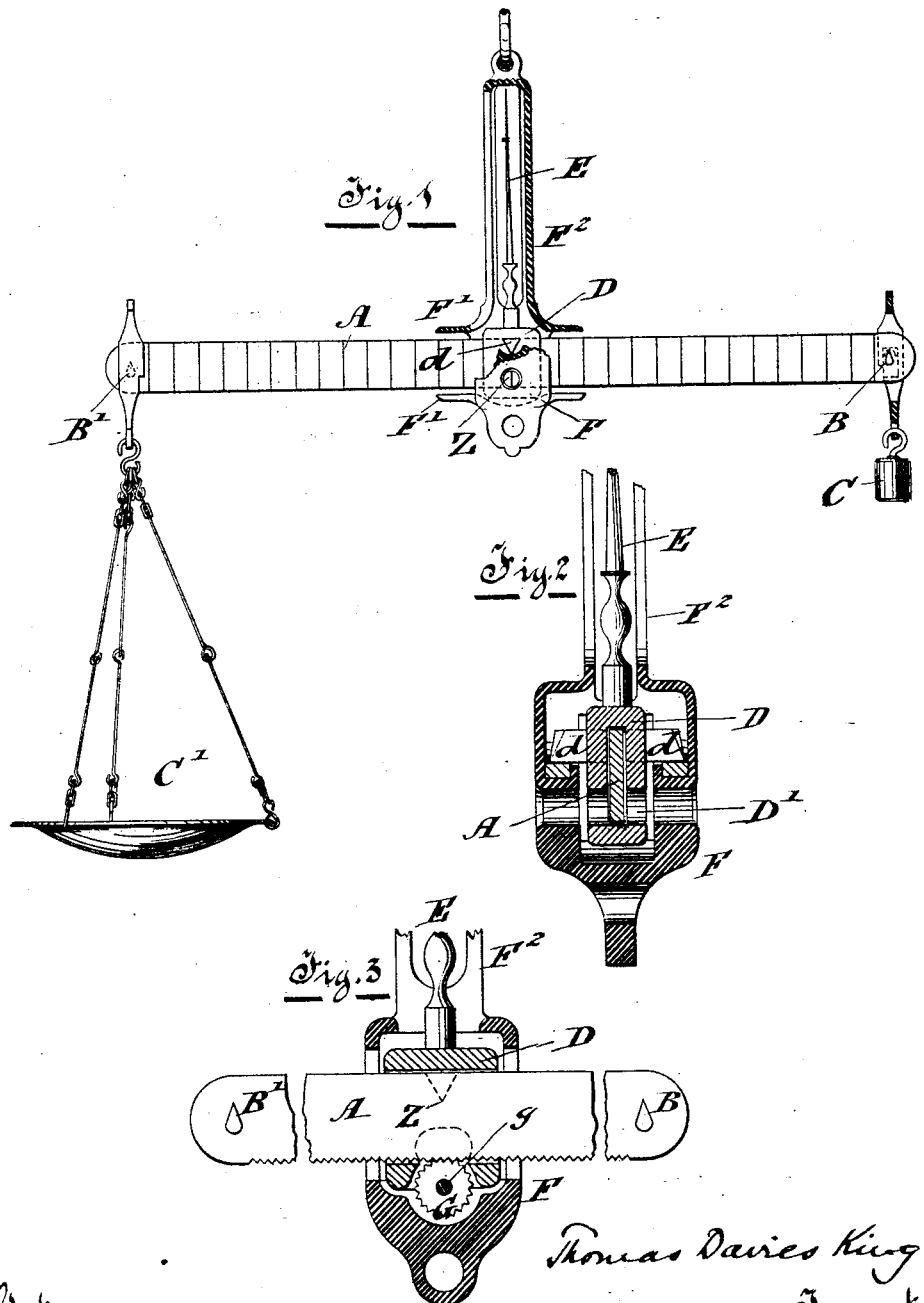

UNITED STATES PATENT OFFICE.

THOMAS D. KING, OF MONTREAL, QUEBEC, CANADA.

BALANCE.

SPECIFICATION forming part of Letters Patent No. 274,202, dated March 20, 1883.

Application filed November 8, 1882. (No model.)

*To all whom it may concern:*

Be it known that I, THOMAS DAVIES KING, of the city of Montreal, in the District of Montreal and Province of Quebec, Canada, have invented a certain new and useful Improved Balance; and I do hereby declare that the following is a full, clear, and exact description of the same.

My invention may be briefly described as consisting in a beam normally suspended in equipoise, and serving, when moved in either direction so as to alter the relative distance between the point of suspension and the points of support respectively of a weight and a scale, to weigh either such weight or multiples or proportional parts of same.

For full comprehension of the invention, reference must be had to the annexed drawings, forming part of this specification, and in which—

Figure 1 is a side view of my balance, partly broken away. Fig. 2 is a vertical cross-section of balance; and Fig. 3, a part sectional elevation, showing modification of beam, &c.

Similar letters of reference indicate like parts.

A is the beam, of the length and section desired, preferably of hardened steel, and B B' knife-edges suitably secured in same, and serving to support respectively a weight, C, and a scale pan, C', which is an exact counterpoise of the weight when the point of suspension of the beam is equidistant from B and B'. This point or zero is shown at Z, Figs. 1 and 3, and the equal distances between Z and B and Z and B' are divided up into any desired number of parts.

D is a sleeve, in which the beam rests, pierced, as shown at D', to allow the zero or other figures on the beam to be seen, and carried by knife edges $d\ d$ in a suspensory frame, F. This frame is, as shown, pierced to correspond with the openings D', and is carried out in the line of the beam on either side, both above and below it, to form stops or bridles F' F', thus preventing undue oscillation. The upper part, $F^2$, of this frame F may be formed either of two or four standards or posts united at the top, so as to allow of the whole being held up or hung to any fixed point; or it may be made as a cylinder with openings, the end being in each case to show the index-finger or tongue E, secured to the sleeve D. The knife-edges $d\ d$ will be in the same horizontal plane with those B B'.

Although I do not confine myself to any specific weight for C, it will in ordinary cases be most convenient to make it a pound, and by dividing up the distances between Z and B B' into sixteen parts the balance may be made to weigh either sixteen pounds or one ounce, the beam being shifted in the direction of B when the multiple of a pound is to be weighed, and toward B' for a proportion of a pound.

It is obvious that the beam may be divided up decimally, or so as to give any proportion desired.

The beam may be so normally set in its support as to require in the scale C' a weight equal to the weight C to bring it into equipoise.

To facilitate the passage of the beam through the sleeve D in either direction and enable its adjustment at any particular point to be more accurately effected, I may form the under edge of such beam, as shown in Fig. 3, with a rack, into which meshes a small pinion-wheel, G, the spindle $g$ of which is carried in suitable bearings in the frame F, and prolonged at one end to form a handle.

By this invention the necessity for the use of weights of different denominations is done away with, and a scale provided which contains within itself everything necessary to weigh within a certain range easily and accurately.

What I claim as new, and wish secured by Letters Patent, is as follows:

1. The combination of a scale-beam adapted to be moved in a sleeve bearing knife-edges, with a suspensory frame, substantially as and for the purposes set forth.

2. The combination of a scale-beam bearing at one end a weight and at the other a scale-pan, with a sleeve in which it is longitudinally adjustable, and a frame in which said sleeve is supported on knife-edges, all substantially as and for the purposes described.

THOMAS DAVIES KING.

Witnesses:
FRAS. HY. REYNOLDS,
OWEN N. EVANS.